Sept. 23, 1969 J. JOHNSON 3,469,046
DIRECTION INDICATOR SWITCHES WITH YIELDABLY
MOUNTED SAFETY CANCELLING CAM
Filed April 14, 1967 2 Sheets-Sheet 2

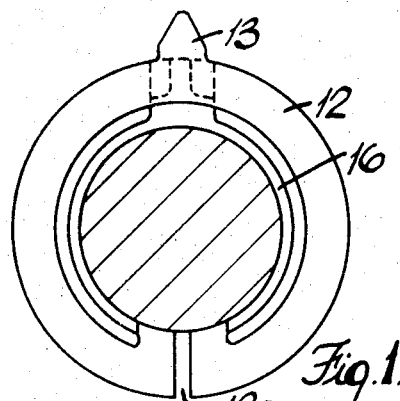
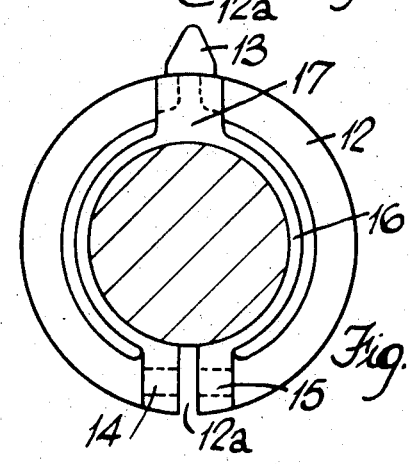
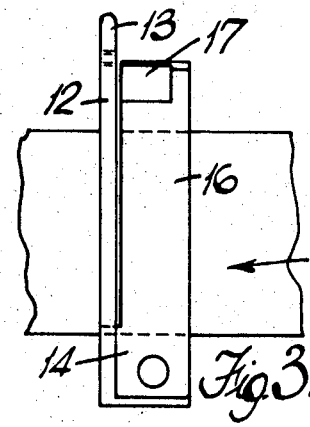
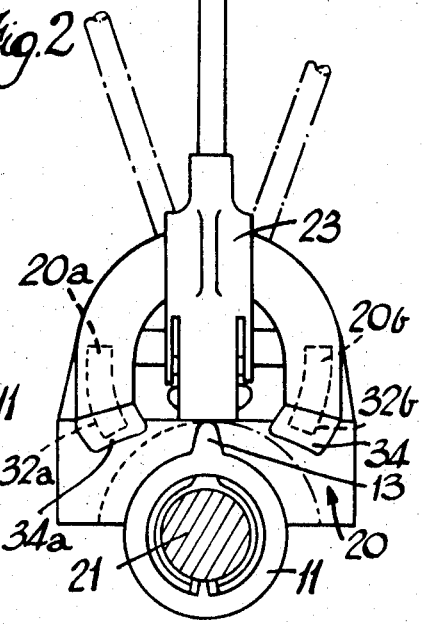

United States Patent Office 3,469,046
Patented Sept. 23, 1969

3,469,046
**DIRECTION INDICATOR SWITCHES WITH YIELD-
ABLY MOUNTED SAFETY CANCELLING CAM**
James Johnson, Ryde, Isle of Wight, England, assignor to
Joseph Lucas (Industries) Limited, Birmingham, England
Filed Apr. 14, 1967, Ser. No. 631,079
Int. Cl. H01h 3/16
U.S. Cl. 200—61.34                    2 Claims

ABSTRACT OF THE DISCLOSURE

A cancelling cam for a road vehicle direction indicator switch having a first part adapted to be fixed relative to the steering wheel of the vehicle, and a second part resiliently mounted on the first part and including a striker engageable in use with latches within the switch.

---

In United States Patent No. 3,359,384 there is claimed a direction indicator switch which in use is cancelled by a striker rotatable with the steering wheel of a road vehicle comprising in combination a support, an actuating member pivotally connected to said support for angular movement in opposite directions from an inoperative position to a pair of operative positions in which in use the switch completes circuits to direction indicator lamps on opposite sides of the vehicle respectively, resilient means urging the actuating member to its inoperative position, latch means serving to retain the actuating member in its operative positions against the action of the resilient means, and a pair of cams which when the actuating member is moved to its operative positions are moved into the path of movement of said striker respectively, the shape of the cams being such that when a turn indicated by the switch is negotiated the striker will move the appropriate cam towards the support, but after the turn has been negotiated the striker moves in the opposite direction and moves the cam away from the support, movement of the cam away from the support serving to release the latch means so that the resilient means returns the switch to the inoperative position.

In such a switch, movement of a cam towards the support is limited, and so if the striker is not accurately positioned it will not be possible for the cam to move sufficiently to allow the striker to pass. It is an object of the present invention to provide a cancelling cam incorporating the striker, in a form in which this difficulty is minimized.

According to the invention a cancelling cam for use with a switch of the kind mentioned above includes a first part adapted to be fixed relative to the steering wheel of the road vehicle and a second part resiliently mounted on the first part and carrying the striker, the second part being movable away from the first part to allow the striker to ride over the cam in use when the turn indicated by the switch is negotiated, but engaging the first part when the steering wheel moves in the opposite direction so that the cam will be moved away from the support to return the switch to its inoperative position.

One example of the invention is illustrated in the accompanying drawings wherein:

FIGURES 1, 2 and 3 are plan, inverted plan and side views respectively of a cancelling cam secured to the steering column of a road vehicle.

FIGURES 4, 5 and 6 are plan, inverted plan and side views respectively of a direction indicator switch utilizing the cancelling cam shown in FIGURES 1, 2 and 3.

Figure 5:
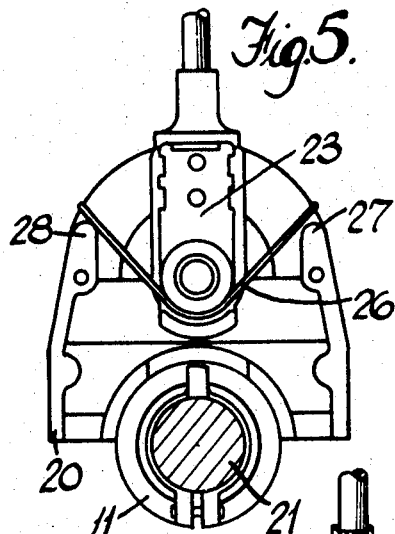
Figure 6:
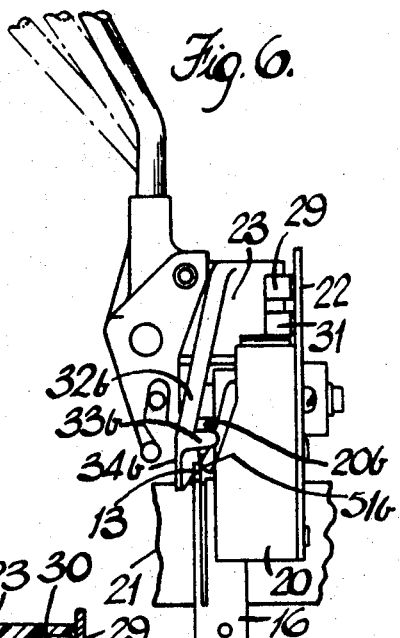
Figure 7:
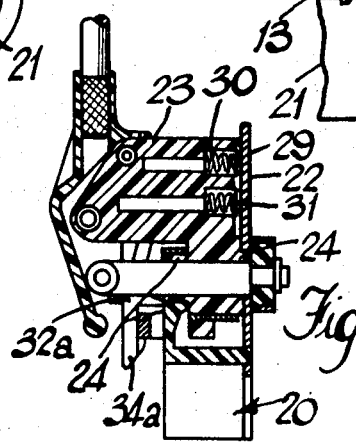
FIGURE 7 is a sectional view on the line 7—7 in FIGURE 4 with the cancelling cam omitted for clarity.
Figure 8:
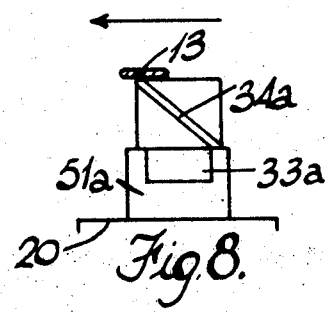
FIGURES 8, 9 and 10 are diagrammatic views illustrating the cancelling operation of the switch.

Referring first to FIGURES 1 to 3, the cancelling cam is moulded in a synthetic resin material and comprises a resilient annular portion 12 radially split at 12a and carrying an outwardly directed striker 13 diametrically opposite the split 12a. Integrally formed with portion 12 is a pair of axially extending lugs 14, 15, one on each side of the split 12a. Integral with the lugs 14, 15 and coaxial with the portion 12 is a short cylindrical member 16 the external diameter of which is slightly less than the diameter of the central hole in the portion 12. The member 16 is formed with an outwardly directed lug 17 which overlies the portion 12. The internal diameter of the member 16 is substantially the same as the diameter of the steering column to which the striker is to be secured and in use a screw passing through the lugs 14, 15 is tightened to close the split 12a and clamp the member 16 to the steering column so that the cam 11 is rotatable therewith.

Referring now to FIGURES 4 to 10 the direction indicator switch comprises a moulded, synthetic resin support 20 which in use is secured to the outer stationary tube of a motor vehicle steering column indicated by the numeral 21. The support 20 carries a contact board 22. There is further provided a moulded synthetic resin actuating member 23 which is pivotally mounted between the support 20 and the board 22 through the intermediary of a pair of coaxial cylindrical posts 24 integral with the member 23, the posts 24 extending through holes in the support 20 and board 22, and the arrangement being such that the axis about which the member 23 pivots is parallel to the axis of the steering column.

A V-shaped spring 26 is secured at its apex to the member 23 in such a position that the arms of the spring extend beyond the pivotal axis of the member 23 and engage lugs 27, 28 formed on the support 20, so that the spring 26 resists relative rotation between the member 23 and the support 20 in either angular direction, and urges the actuating member to its inoperative position shown. A pair of bridging contacts 29, 31, supported by the member 23 are urged into engagement with the board 22 by springs 30, and in the inoperative position shown engage respectively a pair of contacts printed on the board and connected in use to the vehicle battery. When the actuating member 23 is moved in one angular direction one of the bridging contacts completes a circuit by way of a flasher to the direction indicator lamps on one side of the vehicle, while the other bridging contact operates a warning lamp. Movement of the member 23 in the other angular direction operates the indicator lamps on the other side of the vehicle and also operates a second warning lamp.

Integrally formed with the member 23 are a pair of resilient arms 32a, 32b which when the actuating member 23 is moved in opposite angular directions are moved into the path of the striker 13. The arms 32a, 32b incorporate latch portions 33a, 33b extending in planes parallel to the steering axis, and cam portions 34a, 34b which extend towards the steering shaft. The latch portions 33a, 33b slide on ramps 20a, 20b integral with the support 20.

In order to energise the lefthand direction indicator circuit of the vehicle the member 23 is pivoted in a counter clockwise direction (FIGURE 1) about the posts 24, which causes the latch portions 33a to ride up the ramp 20a until it reaches the end of the ramp, at which point the resilience of the arm 32a causes the latch portion 33a to engage a shoulder 51a at the end of the ramp 20a. The engagement of the portion 33a with the shoulder 51a maintains the switch in the operative position against the action of the spring 26. When the switch is so positioned the cam portion 34a lies in the path of the striker 13.

Figures 9, 10:
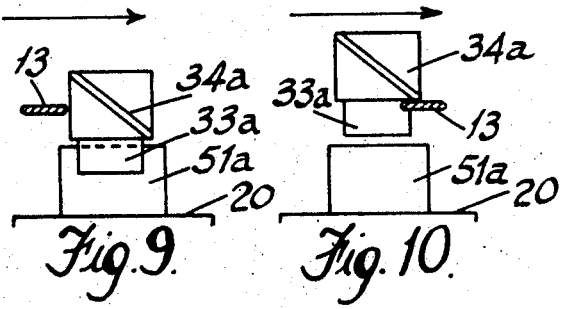

When the vehicle negotiates the indicated left turn, the steering wheel is rotated in a counter clockwise direction, which causes the striker to engage the cam portion 34a (FIGURE 8) thereby urging the portion 33a towards the support 20. However, the arrangement is such that the arm 32a engages the highest point of the ramp 20a and thus prevents further movement of the portion 33a towards the support 20. Continued rotation of the steering wheel causes the striker 13 to ride up the cam portion 34a thereby flexing the portion 12 of the cam 11 away from the lug 17 on the member 16. As the striker 13 rides over the portion 34a of the arm 32a the portion 12 of the cam 11 returns to its original position. On completion of the left turn the steering wheel is rotated in a clockwise direction and as shown in FIGURES 9 and 10 the striker 13 again engages the cam portion 34a, and in so doing lifts the portion 33a away from the support 20 clear of the shoulder 51a thereby allowing the switch to be returned by the action of the spring 26 to its inoperative position.

Flexure of the portion 12 of the cam 11 during the return movement of the steering wheel is arrested by engagement of the portion 12 with the lug 17 on the member 16 of the cam 11.

The sequence of operations involved when the vehicle is making a right turn are similar, the arm 32b being moved into the path of movement of the striker 13 in this case. The return action of the spring 26 is supplemented by the co-action of the portions 33a, 33b of the arms 32a, 32b with the ramps 20a, 20b.

Having thus described by invention what I claim as new and desire to secure by Letters Patent is:

1. A direction indicator switch which in use is cancelled by a striker rotatable with the steering wheel of a road vehicle, comprising in combination a support, an actuating member, means pivotally connecting said actuating member to said support for angular movement in opposite directions from an inoperative position to a pair of operative positions in which in use the switch completes circuits to direction indicator lamps on opposite sides of the vehicle respectively, resilient means acting between the support and actuating member and urging the actuating member to its inoperative position, co-operating latch means on said actuating member and support, said latch means serving when the actuating member is moved to an operative position to retain said actuating member in said operative position against the action of the resilient means, a pair of cams carried by said actuating member and which when the actuating member is moved to its operative positions are moved into the path of movement of said striker respectively, each of said cams being movable towards and away from said support and being inclined to the plane of rotation of said striker and defining a first surface which when a turn indicated by the switch is negotiated is engaged by the striker to move the appropriate cam towards the support, and a second surface which is engaged by the striker on return movement thereof after a turn has been negotiated to move the cam away from the support, and means responsive to movement of a cam away from the support for releasing the latch means so that the resilient means returns the switch to the inoperative position, characterised in that said striker includes a first part fixed relative to the steering wheel of the road vehicle, and a second part which engages said first and second surfaces of each of said cams, and resilient means mounting said second part relative to said first part for movement relative to said first part in a direction away from said support.

2. A direction indicator switch as claimed in claim 1 wherein the first and second parts of said striker are moulded integrally in a synthetic resin providing the required resilience between the first and second parts.

References Cited

UNITED STATES PATENTS 2,569,096  9/1951  Geiger et al. _____ 200—61.34 X
3,359,384  12/1967  Nevett _____ 200—61.34

ROBERT K. SCHAEFER, Primary Examiner
ROBERT A. VANDERHYE, Assistant Examiner

U.S. Cl. X.R.
74—567; 200—153.11